(12) United States Patent
Patel et al.

(10) Patent No.: US 10,938,423 B2
(45) Date of Patent: Mar. 2, 2021

(54) FREQUENCY CONVERSION METHODOLOGY FOR SATELLITE NETWORKS

(71) Applicant: Hughes Network Systems, LLC, Germantown, MD (US)

(72) Inventors: Kumudchandra Patel, Germantown, MD (US); Walter Robert Kepley, Germantown, MD (US); Michael J. Scott, Germantown, MD (US)

(73) Assignee: Hughes Network Systems, LLC, Germantown, MD (US)

(*) Notice: Subject to any disclaimer, the term of this patent is extended or adjusted under 35 U.S.C. 154(b) by 0 days.

(21) Appl. No.: 16/446,170

(22) Filed: Jun. 19, 2019

(65) Prior Publication Data

US 2019/0393905 A1    Dec. 26, 2019

Related U.S. Application Data

(60) Provisional application No. 62/687,641, filed on Jun. 20, 2018.

(51) Int. Cl.
*H04B 1/00* (2006.01)
*H04B 7/185* (2006.01)

(52) U.S. Cl.
CPC ....... *H04B 1/0007* (2013.01); *H04B 7/18517* (2013.01)

(58) Field of Classification Search
CPC ........... H04M 11/062; H04B 3/46; H04B 3/32
USPC ....................................................... 375/222
See application file for complete search history.

(56) References Cited

U.S. PATENT DOCUMENTS

| | | | | |
|---|---|---|---|---|
| 5,787,171 | A | * 7/1998 | Kubota | ................ H04N 7/1675 348/E7.056 |
| 2002/0009059 | A1 | * 1/2002 | Abutaleb | ........... H04B 7/18532 370/318 |
| 2004/0048576 | A1 | * 3/2004 | Hildebrand | ............ H04B 1/525 455/67.13 |
| 2006/0160500 | A1 | 7/2006 | Ammar | |
| 2009/0156133 | A1 | 6/2009 | Rofougaran et al. | |
| 2014/0308892 | A1 | * 10/2014 | Lee | ....................... H04B 7/1858 455/9 |
| 2015/0155953 | A1 | * 6/2015 | Demine | .................... H04B 3/00 375/219 |
| 2016/0191149 | A1 | 6/2016 | Jackson et al. | |
| 2018/0262218 | A1 | 9/2018 | Eng et al. | |
| 2019/0245598 | A1 | * 8/2019 | Berg | ..................... H04B 1/0475 |

OTHER PUBLICATIONS

Extended European Search Report for EP20180277 (7 pages).

* cited by examiner

*Primary Examiner* — Shuwang Liu
*Assistant Examiner* — Gina M McKie
(74) *Attorney, Agent, or Firm* — Bejin Bieneman PLC

(57) ABSTRACT

A system comprises a modem, configured to transmit data modulated based on an intermediate frequency within one of a C, X, or Ku band, and a single-stage block-up converter having an input electrically coupled via one inter-facility link cable to the modem, and an output electrically coupled to a high-power amplifier. The single-stage block-up-converter is configured to up-convert the intermediate frequency to a satellite communication frequency within the Ka, Q, or V band.

9 Claims, 2 Drawing Sheets

FREQUENCY CONVERSION METHODOLOGY FOR SATELLITE NETWORKS

CROSS-REFERENCE TO RELATED APPLICATIONS

This patent application claims priority to and all the benefits of U.S. Provisional Patent Application No. 62/687,641 filed on Jun. 20, 2018, which is herein incorporated by reference in its entirety.

BACKGROUND

Satellite communication modems are typically connected via cables to a frequency up-converter circuit, amplifier, and antenna. While the satellite modem may be indoors, the up-converter, amplifier, and antenna are installed outdoors. A satellite modem communicates with an intermediate frequency to the up-converter and the up-converter converts the carrier frequency to a higher feeder link frequency used to communicate with the satellite. High Throughput Satellite (HTS) networks face increased data capacity demands, which require the use of higher frequency feeder link spectrum to communicate with the satellite.

DETAILED DESCRIPTION

A system comprises a modem, configured to transmit data modulated based on an intermediate frequency typically within one of a C, X, or Ku frequency band, and a single-stage block-up converter having an input electrically coupled via one inter-facility link cable to the modem, and an output electrically coupled to a high-power amplifier. The single-stage block-up-converter is configured to up-convert the intermediate frequency to a satellite communication frequency within the Ka, Q, or V band.

Disclosed herein are conversion schemes for Ka and V band applications in gateway feeder links (i.e., between a gateway and a satellite) in an HTS (High Throughput Satellite) or VHTS (Very High Throughput Satellite) network. Current systems include multiple stages of frequency up-conversion in gateway feeder links. HTS and VHTS systems are typically partitioned to provide satellite gateway forward link functionality in a modem, block-upconverter (BUC), high power amplifier (HPA), and antenna. Systems and methods disclosed herein advantageously address the complexities of frequency translation required to convert data at a baseband to multiple, modulated signal carriers at feeder link frequencies.

Figure 1:
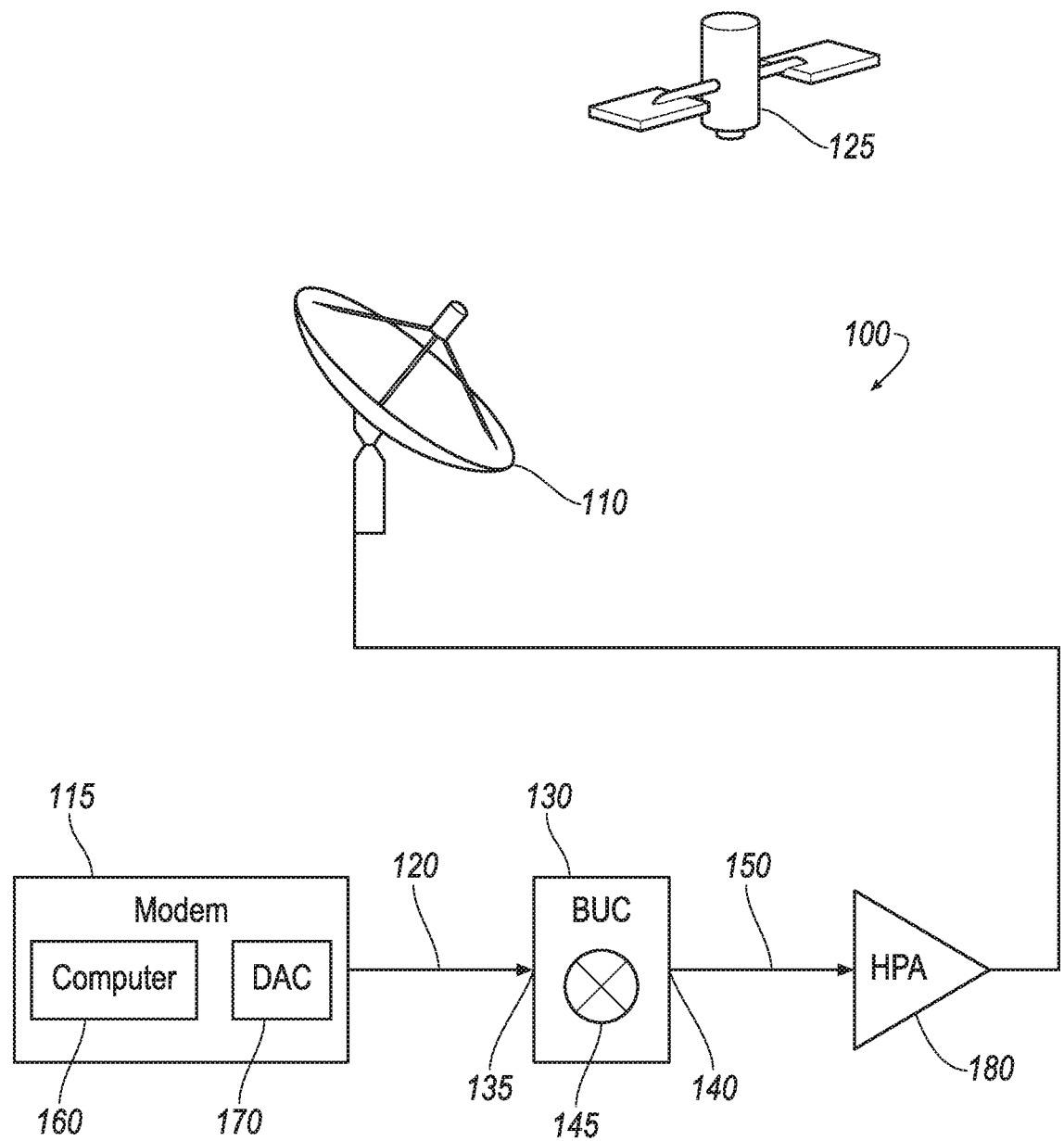
FIG. 1 shows an example satellite feeder link system.

As illustrated in FIG. 1, a system 100 (or satellite feeder link system 100) includes an antenna 110, a terminal or modem 115, a Block Up Converter (BUC 130), an Interfacility Link (IFL 120), and a High Power Amplifier (HPA 170). The system 100 communicates via the antenna 110 to one or more satellites (not shown).

The satellites collectively form a constellation (i.e., a group) of network nodes whose position may change relative to one another, to the ground, or both. The satellites include various circuits, chips, or other electronic components. For example, satellites may be in low Earth orbit (LEO) in multiple planes and orbits relative to one another or in a geostationary orbit (GEO).

An antenna 110 may include a low-noise block downconverter (LNB) mounted on a dish, which may collect radio waves from the dish and convert the collected radio waves to a signal which is sent through wired connection, e.g., a cable, to the modem 115. The antenna 110 serves as a radio frequency (RF) front end of the modem 115, receiving a microwave signal from a satellite 125 collected by the dish, amplifying the received signal, and converting the block of frequencies to a lower block of intermediate frequencies (IF). This conversion of RF to a lower block of IF-, allows the signal to be carried, e.g., via a wired connection, to a modem 115.

An antenna 110 typically includes a sender antenna configured to send radio frequency waves to a satellite. The antenna 110 is electrically wired to the HPA 170 to receive outgoing RF signal from the HPA 170 and to send the RF signal via a wireless satellite link to a satellite. In the present context, a satellite link is a wireless communication between a modem 115 antenna 110 and a satellite. A satellite 125 link is typically established upon configuring a modem 115 modulator, demodulator, encoder, and/or decoder to communicate with a satellite.

The satellite link may operate in a Ka band, Q band, or V band. The Ka band is a portion of the electromagnetic spectrum defined as frequencies in the range of 26.5-40 gigahertz (GHz). The Q band is a range of frequencies included in the microwave region of the electromagnetic spectrum in a range of 33 to 50 GHz. The V band is a band of frequencies in the microwave portion of the electromagnetic spectrum ranging from 40 to 75 GHz.

A modem 115 is a communication device including a computer processor and memory, i.e., implemented via circuits, chips, and/or other suitable electronic components. A modem 115 can communicate with satellites 125 that are within communication range of the modem 115 antenna 110. In some instances, the modem 115 is stationary relative to a location on Earth. In other instances, the modem 115 is mobile, meaning that the modem 115 moves relative to a location on the Earth. The modem 115 is coupled via an IFL cable 120 to send data to the BUC 130.

The modem 115 includes a computer 160 and a digital-to-analog (DAC) converter 170. The modem 115 outputs a radio frequency (RF) signal modulated based on an intermediate frequency $F_{IFL}$ in the C band (4 to 8 GHz), X band (8 to 12 GHz) or the Ku band (12 to 18 GHz), and provides the modulated radio frequency signal to the BUC 130 via one IFL cable 120, which couples the modem 115 and the BUC 130. The intermediate frequency is the modulation frequency for communication between the modem 115 and the BUC 130, i.e., the frequency based on which the output RF signals of the modem 115 are modulated.

The computer 160 is a machine including a processor and memory. A computer memory can be implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store instructions executable by the processor and other data. The processor is implemented via circuits, chips, or other electronic components and may include one or more microcontrollers, one or more field programmable gate arrays (FPGAs), one or more application specific integrated circuits (ASICs), one or more digital signal processors (DSPs), one or more customer specific integrated circuits, etc. The processor(s) in computers 160 may be programmed to execute instructions stored in the memory to carry out the actions, as discussed herein.

The DAC 170 includes one or more chips that convert a digital data stream to an analog modulated RF signal. For example, a DAC 170 may receive a digital data stream from the computer 160 via a plurality of digital inputs and can then output an analog value corresponding to the digital input data modulated based on the intermediate frequency $F_{IFL}$. Thus, the DAC 170 can modulate the converted analog signal based on the intermediate frequency $F_{IFL}$. In another example, the modem 115 includes a modulator chip or circuit that can receive an analog signal output (i.e., an analog value corresponding to the digital input) of the DAC 170 and that can then generate the RF signal transmitted via the IFL cable 120 which is modulated based on the intermediate frequency $F_{IFL}$.

The intermediate frequency $F_{IFL}$ is the frequency of the modulated signal (or waveform) transmitted via the IFL cable 120 to the BUC 130. A modulator (or RF modulator) is an electronic device which is used to modulate a radio frequency based on a baseband frequency, e.g., a local oscillator output. The intermediate frequency $F_{IFL}$ may be in C, X, or Ku band, as discussed below.

The system 100 may have a bandwidth bw which specifies a volume of data transmitted from the modem 115 to the antenna 110. In the present context, a system bandwidth bw is an amount of data transmitted per unit of time from the modem 115, via the BUC 130, HPA 180, and antenna 110, to the satellite 125, and may be specified, for example, in gigahertz (GHz), megahertz (MHz), etc. In one example, the system 100 could have a bandwidth bw of 6 GHz. Thus, (i) the modulated RF signal outputted from the modem 115 via the IFL cable 120 and (ii) the up-converted RF signal outputted from the BUC 130 to the HPA 180, each provide at least a bandwidth bw of 6 GHz. With respect to the intermediate frequency $F_{IFL}$, and the bandwidth bw, a frequency spectrum of an RF signal transmitted via the IFL cable 120 may be between $$F_{IFL} - \frac{bw}{2} \text{ and } F_{IFL} + \frac{bw}{2}.$$

An IFL cable 120 is an electrical coupling such as coaxial cable that connects the BUC 130 to the modem 115. Typically, IFL cable 120 is the electrical connection between an indoor (i.e., inside a building) unit including the modem 115 and outdoor (i.e., not inside a building) components including the BUC 130, HPA 180, and antenna 110.

The HPA 170 is implemented via chips and/or microwave vacuum tube amplifier circuits, etc. The HPA 170 amplifies the received signal from the BUC 130 and transmits the amplified signal via the antenna 110 to the satellite 125.

Thus, a gain of an HPA 170 is at least sufficient to allow communication via a satellite link between the antenna 110 and a satellite 125. Additionally or alternatively, other types of amplifier circuits may be used. The HPA 180 is electrically coupled to the antenna 110, e.g., via a waveguide section between the HPA 180 output flange and an antenna 110 feed flange.

A BUC 130 is an electronic device implemented via circuits, chips, etc., that increases a carrier frequency of an RF signal being transmitted from the modem 115 to the antenna 110. The BUC 130 has an input 135 coupled via the IFL cable 120 to the modem 115 and an output 140 electrically coupled to the HPA 180. The BUC 130 is a single-stage BUC 130, i.e., including one stage mixer 145 (i.e., there is no cascade of mixers after one another). The mixer 145 receives and mixes together the RF signal of modem 115 which is modulated based on the intermediate frequency $F_{IFL}$ and a local oscillator frequency $F_{LO}$, and up-converts the RF signal to the V band. "Up-conversion" means increasing a modulation base frequency of an RF signal, e.g., from the frequency $F_{IFL}$ to a satellite communication frequency $F_S$, which is equal to $F_{IFL}+F_{LO}$. A single-stage BUC 130 can be partially based on having only one IFL cable 120; otherwise an additional stage of mixing would have been necessary to mix the outputs of the IFL cables 120. Thus, a possibility of using a single-stage mixer BUC 130 is a benefit of having only one IFL cable 120.

With respect to the operation of the mixer 145, mixing (i) the input signal with the intermediate frequency $F_{IFL}$ with (ii) the locally generated local oscillator $F_{LO}$ results in signal frequencies with various combinations $m^*F_{IFL} \pm n^*F_{LO}$, where m=0, 1, 2, . . . & n=0, 1, 2, . . . . Thus, the mixer 145 outputs a desired output signal having a satellite communication modulation frequency $F_S$ (or $F_{IFL}+F_{LO}$) and also other spurious frequency outputs (or spurious frequency combinations) that should be suppressed through filtering. In the present context, the spurious (or unwanted) frequency combination include any result of the mixer 145 where at least one of m or n is unequal to 1 or there is a subtraction operation instead of addition, e.g., $2^*F_{IFL}+F_{LO}$, $F_{IFL}+2^*F_{LO}$, $3^*F_{IFL}-F_{LO}$, $3^*F_{LO}$, etc. While the result $F_{IFL}+F_{LO}$ is a desired frequency combination from the mixer 145, the spurious frequency combinations should be suppressed.

Table 1 shows example sets $F_{IFL}$, $F_{LO}$, and frequencies of RF signal outputted by the mixer 145. The mixer 145 of the BUC 130 up-converts the intermediate frequency $F_{IFL}$ to a satellite communication frequency $F_S$ of 50 GHz (in V band) using a local frequency $F_{LO}$ of 42 GHz. For simplicity, only m values 0, 1, 2 are shown in Table 1. As shown in Table 1, the RF signal output of the mixer 145 may have base frequencies 42, 50, and 58 GHz, while 50 GHz is the only desired RF signal. The columns labeled Min and Max show a range of output frequency based on a bandwidth bw of 6 GHz, as discussed above.

TABLE 1

| bw = 6 GHz | | | | RF Signal Range | | | |
|---|---|---|---|---|---|---|---|
| m | $F_{IFL}$ | n | $F_{LO}$ | $F_{RF}$ (min) | $F_{RF}$ (center) | $F_{RF}$ (max) | Notes |
| 0 | 8 ± 3 | + | 1   42 | — | 42 | — | The 42 GHz FLO spurious output is close to the lower band edge of the desired spectrum (47-53 GHz). |
| 1 | 8 ± 3 | + | 1   42 | 47 | 50 | 53 | Desired Spectrum (47-53 GHz) |
| 2 | 8 ± 3 | + | 1   42 | 52 | 58 | 64 | The lower band edge of 52-64 GHz spurious output is partially inside the |

TABLE 1-continued

| bw = 6 GHz | | | | RF Signal Range | | | |
|---|---|---|---|---|---|---|---|
| m | $F_{IFL}$ | n | $F_{LO}$ | $F_{RF}$ (min) | $F_{RF}$ (center) | $F_{RF}$ (max) | Notes |
| | | | | | | | desired spectrum (47-53 GHz) so it cannot be completely filtered, and it can interfere with the desired signal. |

Table 2 shows further example sets $F_{IFL}$, $F_{LO}$, and frequencies of RF signal outputted by the mixer 145 based on these further example frequencies $F_{IFL}$, $F_{LO}$. As shown in Table 2, the output of mixer 145 may have at least the base frequencies 35, 50, and 65 GHz. The columns labeled Min and Max show a range of output frequency based on a bandwidth bw of 6 GHz, as discussed above.

TABLE 2

| bw = 6 GHz | | | | RF Signal Range | | | |
|---|---|---|---|---|---|---|---|
| m | $F_{IFL}$ | n | $F_{LO}$ | $F_{RF}$ (min) | $F_{RF}$ (center) | $F_{RF}$ (max) | Notes |
| 0 | 15 ± 3 | + | 1 | 35 | — | 35 | — | The 35 GHz $F_{LO}$ spurious output is away from the lower band edge of the desired spectrum (47-53 GHz) so it is very easy to filter. |
| 1 | 15 ± 3 | + | 1 | 35 | 47 | 50 | 53 | Desired Spectrum (47-53 GHz) |
| 2 | 15 ± 3 | + | 1 | 35 | 59 | 65 | 71 | The lower band edge of the 59-71 GHz spurious output is away from the upper band edge of the desired spectrum (47-53 GHz) so it can be easily filtered out. |

A filter circuit of the BUC 130 which has an input coupled to the mixer 145 output filters out the spurious combinations, e.g., (i) the frequency combinations 42 and 58 GHz for the example system 100 of Table 1 and (ii) the frequency combinations 35 and 65 GHz for the example system 100 of Table 2.

With respect to the bandwidth bw of 6 GHz, the BUC 130 filter circuit may include a high-pass filter circuit that allows frequencies greater than 47 GHz to pass and a low-pass filter that allows frequencies below 53 GHz to pass. In other words, the filter circuit allows the desired frequency range of 47 to 53 GHz to pass. However, a filter circuit typically has a cut off frequency and does not stop the passage of RF signals right at the cut off frequency. For example, for a high-pass filter circuit allowing frequencies greater than 47 GHz to pass, still allows, based on a gain slope of the filter, a weaken (or attenuated) RF signal below 47 GHz to pass too, e.g., greater than 44 GHz. In another example, the low-pass filter circuit may allow attenuated RF signals with frequencies greater than 53 GHz to pass. The spurious output 42 GHz is close to a lower band edge of the desired spectrum (47-53 GHz) and it would need a sharp high pass or band pass filter to attenuate (or eliminate) the spurious output.

With reference to Table 1, the system 100 may experience interference at combination frequencies within the desired frequency range 47-53 GHz. For example, as discussed above, the low-pass filter may attenuate frequencies of above 53 GHz. The lower band edge of spurious output 52-64 GHz is partially inside the desired spectrum (47-53 GHz) so it cannot be completely filtered, which results in an interfere with the desired signal. Thus, to prevent the interference, in one example solution, the bandwidth bw of the system 100 may be reduced. As shown in the example system 100 of Table 1, by reducing the bandwidth bw from 6 to 4 GHz, the interference may be prevented, but the reduction in interference comes at a cost of reducing the bandwidth bw.

On the other hand, with reference to Table 2, in this example a system 100 having the intermediate frequency $F_{IFL}$ may experience no interference because no combination frequency range overlaps with the desired frequency range 47 to 53 GHz. Thus, by selecting an intermediate frequency $F_{IFL}$ within the Ku band, a filter circuit for the BUC 130 which suppresses the combination frequencies is easier to build than a filter circuit for a with lower intermediate frequencies $F_{IFL}$, such as in the example of Table 1, a bandwidth bw may be reduced, as discussed above. In one example, a system 100 with no interference may be a system 100 in which a spurious frequency combination and a nearest frequency that passes through the filter are at least apart by a minimum frequency domain, e.g., 2 GHz. Frequency domain is a frequency range, e.g., a domain between 10 and 15 GHz is a 5 GHz frequency domain. For example, with reference to Table 2, the spurious output 35 GHz is away from the lower band edge of the desired spectrum (47-53 GHz) so it is easy to filter. The lower band edge of the spurious output 59-71 GHz is away from the upper band edge of the desired spectrum (47-53 GHz) so it can be easily filtered out.

Figure 2:
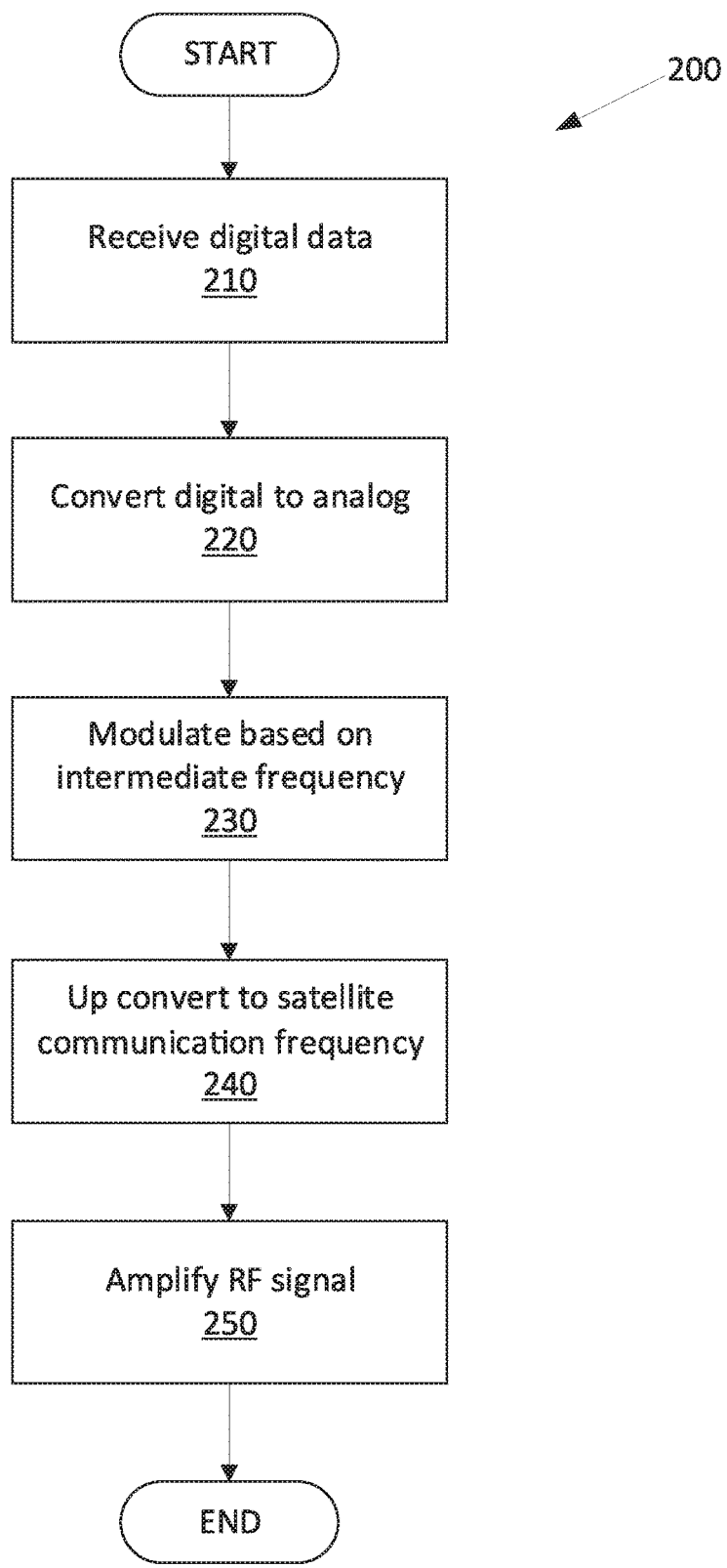
FIG. 2 is a flowchart of an example process for operation of the satellite feeder link system of FIG. 1.

FIG. 2 is a flowchart of an example process 200 for operation of the satellite feeder link system of FIG. 1. Components of the system 100 may be configured and/or programmed to execute blocks of the process 200.

The process 200 begins in a block 210, in which the computer 160 receives digital data, e.g., data from a terrestrial communication network, and outputs the digital data to the DAC 170.

Next, in a block 220, the DAC 170 converts the digital data to an analog value.

Next, in a block 230, the DAC 170 modulates the analog value based on the intermediate frequency $F_{IFL}$. Alternatively, the DAC 170 may be configured to output an analog value, corresponding to the digital input of the DAC 170, to a modulator chip that is configured to modulate the analog value based on the intermediate frequency $F_{IFL}$.

Next, in a block 240, the BUC 130 up-converts the received RF signal to the satellite communication frequency $F_S$.

Next, in a block 250, the HPA 180 amplifies the RF signal and outputs the amplified RF signal to the antenna 110. Following the block 250, the process 200 ends, or alternatively returns to the block 210, although not shown in FIG. 2.

In general, the computing systems and/or devices described may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, network devices such as a gateway or modem, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A system comprising:
a modem, configured to transmit, via a modem output, data modulated based on an intermediate frequency within one of a C, X, or Ku band; and
a single-stage block-up converter having
an input electrically coupled via one inter-facility link cable to the modem output;
a block-up converter output electrically coupled to a high-power amplifier, wherein the single-stage block-up-converter is configured to up-convert the intermediate frequency of the modulated data to a satellite communication frequency within the Ka, Q, or V band;
a mixer having a mixer output; and
a filter circuit including a filter input coupled to the mixer output and filter output coupled to the output of the block-up-converter, configured to:
pass frequencies within a desired spectrum determined based on a signal bandwidth and the satellite communication frequency within the Ka, Q, or V band; and
suppress spurious combination frequencies generated by the mixer, wherein the intermediate frequency is determined such that the filter circuit suppresses the spurious combination frequencies when the spurious frequency combination and a nearest frequency that passes through the filter are at least apart by a minimum frequency domain.

2. The system of claim 1, wherein the modem further comprises a digital-to-analog converter configured to:
convert digital data, received at the modem from a remote computer, to an analog value; and
modulate the analog value based on the intermediate frequency.

3. The system of claim 2, wherein the digital-to-analog converter consists of one chip that performs both modulation based on the intermediate frequency and conversion of digital data to analog data.

4. The system of claim 1, wherein the modem further comprises:
a digital-to-analog converter configured to convert digital data, received at the modem from a remote computer, to an analog value; and
a modulator circuit configured to modulate the analog value based on the intermediate frequency.

5. The system of claim 1, wherein the block-up-converter further comprises a local oscillator that generates a local oscillator frequency, wherein the block-up-converter is configured to up-convert the intermediate frequency to the satellite communication feeder link frequency further based on the local oscillator frequency.

6. A system comprising:
means for transmitting, via a modem output, data modulated based on an intermediate frequency within one of a C, X, or Ku band;
means for up converting the intermediate frequency of the modulated data coupled via one inter-facility link cable to the means for transmitting data, to a high-power amplifier, wherein the means for up-converting up-converts the intermediate frequency to a satellite communication frequency within the Ka, Q, or V band; wherein means for up-converting further comprises means for mixing, and means for filtering coupled to the means for mixing, wherein the intermediate frequency is determined such that the filter circuit suppresses spurious combination frequencies generated by means for mixing; and means for mixing is configured to:
pass frequencies within a desired spectrum determined based on a signal bandwidth and the satellite communication frequency within the Ka, Q, or V band; and
suppress spurious combination frequencies generated by the mixer, wherein the intermediate frequency is determined such that the filter circuit suppresses the spurious combination frequencies when the spurious frequency combination and a nearest frequency that passes through the filter are at least apart by a minimum frequency domain.

7. The system of claim 6, wherein the means for transmitting data further comprises means for converting digital data to an analog value configured to:
convert digital data, received at the modem from a remote computer, to an analog value; and
modulate the analog value based on the intermediate frequency.

8. The system of claim 6, wherein the means for transmitting data further comprises:
means for converting digital data received at the modem from a remote computer to an analog value; and
means for modulating configured to modulate the analog value based on the intermediate frequency.

9. The system of claim 6, wherein means for up-converting is further configured to up-convert the intermediate frequency to the satellite communication feeder link frequency further based on a local oscillator frequency.

* * * * *